United States Patent
Oh et al.

(10) Patent No.: US 12,346,923 B2
(45) Date of Patent: Jul. 1, 2025

(54) PROBABILISTIC SEARCH BIASING AND RECOMMENDATIONS

(71) Applicant: Mercari Inc., Palo Alto, CA (US)

(72) Inventors: Byong Mok Oh, Los Altos, CA (US); Dhruv Mehrotra, Mountain View, CA (US); Chiaki Osaka, South San Francisco, CA (US); Naoya Makino, San Francisco, CA (US); Patrick Michael Wiseman, South San Francisco, CA (US); Minami Sueyasu, San Francisco, CA (US)

(73) Assignee: MERCARI, INC., Palo Alto, CA (US)

( * ) Notice: Subject to any disclaimer, the term of this patent is extended or adjusted under 35 U.S.C. 154(b) by 0 days.

(21) Appl. No.: 17/654,484

(22) Filed: Mar. 11, 2022

(65) Prior Publication Data
US 2022/0270121 A1 Aug. 25, 2022

Related U.S. Application Data

(63) Continuation of application No. 16/288,373, filed on Feb. 28, 2019, now Pat. No. 11,282,100.
(Continued)

(51) Int. Cl.
*G06Q 30/00* (2023.01)
*G06F 16/903* (2019.01)
(Continued)

(52) U.S. Cl.
CPC ... *G06Q 30/0206* (2013.01); *G06F 16/90324* (2019.01); *G06F 16/90335* (2019.01);
(Continued)

(58) Field of Classification Search
CPC ............ G06Q 30/0206; G06Q 30/0629; G06F 16/90335; G06F 16/90324; G06F 16/951; G06F 16/908; G06N 3/08
See application file for complete search history.

(56) References Cited

U.S. PATENT DOCUMENTS

| 8,452,785 B1 * | 5/2013 | Iida ................... G06Q 30/0603 705/28 |
| 10,453,119 B2 | 10/2019 | Yenisetty et al. |

(Continued)

FOREIGN PATENT DOCUMENTS

| JP | 2003-316975 A | 11/2003 |
| JP | 2004-070534 A | 3/2004 |

(Continued)

OTHER PUBLICATIONS

Mercari Offers New App to Buy, Sell Brand-Name Goods, Jiji Press English News Service [Tokyo] Aug. 21, 2017; Dialog #1930519151 1pgs. (Year: 2017).*

(Continued)

*Primary Examiner* — Robert M Pond
(74) *Attorney, Agent, or Firm* — Sterne, Kessler, Goldstein & Fox P.L.L.C.

(57) ABSTRACT

Disclosed herein are system, method, and computer program product embodiments for probabilistic search biasing and recommendations. A system including at least one processor may be configured to receive an input relating to an identified item, generate a database query based on the input, and receive a response to the database query. The response may include information on comparable items similar to the identified item, and corresponding metadata for the comparable items. The corresponding metadata may include a range of values corresponding to the comparable items. The system may be further configured to generate a probability score for at least two values of the range of values, based at least on the corresponding metadata for the comparable items. The system may be further configured to output at least a suggested value based on at least the generated probability score for the range of values and prompt for further input.

20 Claims, 6 Drawing Sheets

Related U.S. Application Data

(60) Provisional application No. 62/740,165, filed on Oct. 2, 2018.

(51) Int. Cl.

| | | |
|---|---|---|
| *G06F 16/9032* | (2019.01) | |
| *G06F 16/908* | (2019.01) | |
| *G06F 16/951* | (2019.01) | |
| *G06N 3/08* | (2023.01) | |
| *G06Q 30/0201* | (2023.01) | |
| *G06Q 30/0601* | (2023.01) | |

(52) U.S. Cl.
CPC .......... *G06F 16/908* (2019.01); *G06F 16/951* (2019.01); *G06N 3/08* (2013.01); *G06Q 30/0629* (2013.01)

(56) References Cited

U.S. PATENT DOCUMENTS

| | | | |
|---|---|---|---|
| 10,963,687 B1* | 3/2021 | Williams | G06V 30/414 |
| 11,074,634 B2 | 7/2021 | Oh et al. | |
| 11,282,100 B2* | 3/2022 | Oh | G06N 3/08 |
| 11,341,550 B2 | 5/2022 | Schubert et al. | |
| 11,379,892 B2* | 7/2022 | Acriche | G06F 3/04847 |
| 11,631,096 B2 | 4/2023 | Schubert et al. | |
| 2008/0114756 A1 | 5/2008 | Konig et al. | |
| 2009/0132516 A1* | 5/2009 | Patel | G06F 16/9535 |
| | | | 707/999.005 |
| 2010/0088158 A1* | 4/2010 | Pollack | G06Q 30/0283 |
| | | | 705/26.1 |
| 2011/0078049 A1 | 3/2011 | Rehman et al. | |
| 2011/0213679 A1 | 9/2011 | Petkov et al. | |
| 2011/0251917 A1 | 10/2011 | Etzioni et al. | |
| 2011/0270697 A1 | 11/2011 | Sunkada | |
| 2013/0204859 A1 | 8/2013 | Vijaywargi et al. | |
| 2013/0226945 A1* | 8/2013 | Swinson | G06F 40/247 |
| | | | 707/758 |
| 2013/0238398 A1 | 9/2013 | Rothman | |
| 2013/0254059 A1 | 9/2013 | Teo | |
| 2014/0019285 A1 | 1/2014 | Karthik et al. | |
| 2014/0100991 A1 | 4/2014 | Lenahan et al. | |
| 2014/0136289 A1 | 5/2014 | Settgast | |
| 2015/0186989 A1 | 7/2015 | Kneen et al. | |
| 2017/0039634 A1 | 2/2017 | Yenisetty et al. | |
| 2017/0193506 A1 | 7/2017 | Karnati et al. | |
| 2017/0208256 A1 | 7/2017 | Lin et al. | |
| 2018/0108066 A1 | 4/2018 | Kale et al. | |
| 2018/0308149 A1 | 10/2018 | Guo et al. | |
| 2019/0325490 A1 | 10/2019 | Acriche | |
| 2020/0104866 A1 | 4/2020 | Lagerling et al. | |

FOREIGN PATENT DOCUMENTS

| | | | |
|---|---|---|---|
| JP | 2005-107952 A | 4/2005 | |
| JP | 2008-52672 A | 3/2008 | |
| JP | 2011-525664 A | 9/2011 | |
| JP | 2014-115912 A | 6/2014 | |
| JP | 2017-016321 A | 1/2017 | |
| JP | 2017-021665 A | 1/2017 | |
| KR | 10-2015-0110846 A | 10/2015 | |
| KR | 10-2016-0001578 A | 1/2016 | |
| KR | 10-2018-0051448 A | 5/2018 | |
| KR | 10-2018-007479 A | 6/2018 | |

OTHER PUBLICATIONS

Written Opinion and International Search Report from International Application No. PCT/US2019/054006 dated Jan. 17, 2020, 10 pages.

Non-Final Office Action from U.S. Appl. No. 16/288,379 mailed Oct. 13, 2020.

International Preliminary Report on Patentability for International Application No. PCT/US2019/054006 dated Apr. 15, 2021, 7 pages.

Mercari Home Page, Internet Archive Wayback Machine www.mercari.com, Sep. 29, 2017, 13 pgs. (Year: 2017).

Mercari For Sellers, Internet Archive Wayback Machinewww.mercari.com, Sep. 30, 2017, 3pgs. (Year: 2017).

Mercari For Sellers Selling Items, Internet Archive Wayback Machine www.mercari.com, Sep. 30, 2017, 4 pgs. (Year: 2017).

UU: Mercari For Sellers Selling Items Setting Prices, Internet Archive Wayback Machine www.mercari.com, Sep. 30, 2017, 4 pgs. (Year: 2017).

"How to Price on eBay," Channel Reply Blog, Nov. 8, 2017, channelreply.com/blog/view/how-to-price-on-ebay; 14 pgs (Year: 2017).

Andrade, J. R. et al. "Probabilistic Price Forecasting for Day-Ahead and Intraday Markets: Beyond the Statistical Model", Sustainability, MPDI, 29 pages, 2017.

Notice of Reasons for Refusal, Japanese Patent Application No. 2024-000700, dated Feb. 4, 2025, 6 pages with English Translation.

Decision to Grant, Japanese Patent Application No. 2024-000700, dated May 14, 2025, 6 pages with English Translation.

* cited by examiner

PROBABILISTIC SEARCH BIASING AND RECOMMENDATIONS

CROSS-REFERENCE TO RELATED APPLICATIONS

This application is continuation of U.S. patent application Ser. No. 16/288,373, filed Feb. 28, 2019, now pending, which claims the benefit of U.S. Patent Application No. 62/740,165 titled "Probabilistic Search Biasing and Recommendations," filed Oct. 2, 2018; and is also related to U.S. patent application Ser. No. 16/288,379, titled "Probabilistic Item Matching and Searching," filed Feb. 28, 2019; U.S. patent application Ser. No. 16/288,199, titled "Inventory Ingestion, Image Processing, and Market Descriptor Pricing System," filed. Feb. 28, 2019; U.S. patent application Ser. No. 16/288,203, titled "Inventory Ingestion and Pricing System," filed Feb. 28, 2019; and U.S. patent application Ser. No. 16/288,158, titled "Determining Sellability Score and Cancellability Score," filed Feb. 28, 2019, all of which are herein incorporated by reference in their entireties.

TECHNICAL FIELD

This disclosure relates generally to computer-implemented searching and generating recommendations based on probabilistic analysis of large data sets.

BACKGROUND

Often, when one is interested in buying or selling an item via an online platform, identifying the item and items like it can pose difficulties. For example, to describe an item for sale in a way that does not result in multiple different listings for the same item may be a challenge both for a vendor and for a vending platform. Similarly, for a purchaser to search for a specific item, receiving multiple different results for what may be the same item can be confusing, as is receiving a purchased item that does not match the description of the item at the time of the initial transaction. Along these lines, buyers and sellers have struggled with accuracy of search results and matching items.

A related problem is with providing and receiving relevant search results within terms of service or other meaningful constraints of a given platform for buying or selling. For example, all else being equal, buyers may want to receive items sooner rather than later, and platforms may want to provide a quality-of-service (QoS) level or service-level agreement (SLA) to pair buyers with sellers who can ship and get items delivered sooner rather than later. Similarly, sellers may have no reliable way to guess how to price items in order to move them within a certain time window, how to price items for specific proceeds or to have any likelihood of closing a sale. Within consumer-to-consumer (C2C) markets, including C2C electronic commerce, both buyers and sellers have experienced a long-felt need for smarter platforms to facilitate these aspects of marketing, and to make these easier solutions more transparent and effortless.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, and/or computer program product embodiments, and/or combinations and sub-combinations thereof, for providing probabilistic item matching, searching, search biasing, recommendations, and/or any combination thereof.

Figure 1:
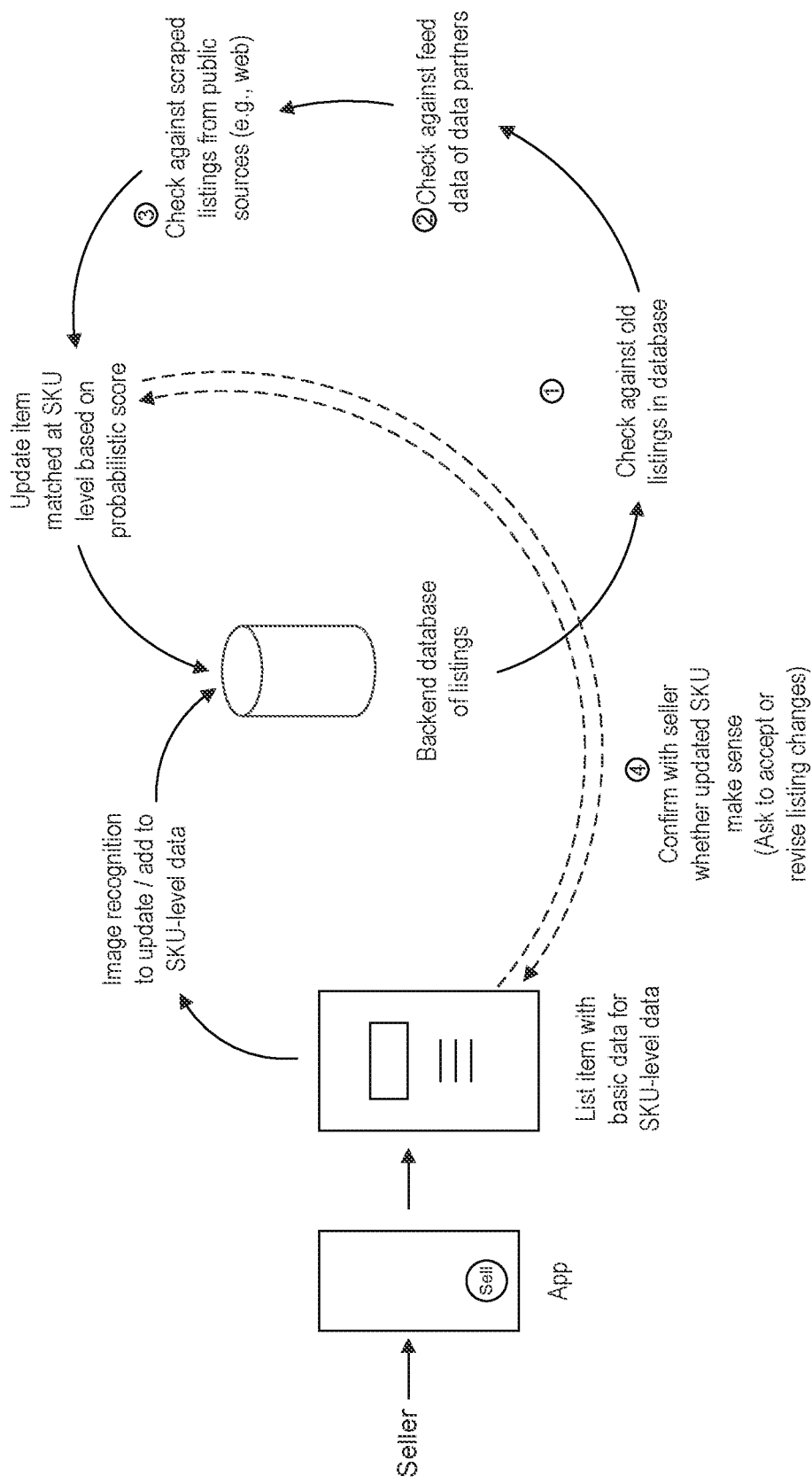
FIG. 1 is an illustration showing an example system useful for implementing methods including probabilistic item matching and searching, according to some embodiments.

FIG. 1 is an illustration showing an example system useful for implementing methods including probabilistic item matching and searching, according to some embodiments.

On the left-hand side of FIG. 1 is a representation of a seller and selling application (app), which may be used for displaying listed items for sale as well as for creating new listings of items for sale, in some embodiments. These representations involve a frontend design of the app, which may be a web app, mobile app (native, web-based, or hybrid, for example), and may involve varying levels of user interaction. Interaction with a buyer instead of a seller may involve similar interaction with the app, in some embodiments.

From the center to the right-hand side of FIG. 1 is a representation of an exemplary backend architecture that may be useful for implementing probabilistic item matching and searching, according to an embodiment. Together, the components shown in FIG. 1, among others, may be treated as making up an example system 100, which may handle operations from storing, retrieving, and/or calculating data (item data, metadata, listings, databases, etc.) on the backend, and processing input, output, results, and related interaction on the frontend.

Beyond interaction with a user (e.g., buyer/seller), the backend may process input from a user and/or a variety of other sources. For example, if a seller provides input regarding an item for a new listing, the backend may seek to confirm, via other input, an identification of what the seller is attempting to list. The other input may be prompted from the seller, automatically derived from other sources, or a combination of both, in some embodiments.

In order to generate a suggested price recommendation, the backend may do any of the following, in any order: (1) check against old listings in a backend database of listings, e.g., on the same platform; (2) check against feed data of data partners, e.g., via a subscription service between the same platform and a third-party provider; (3) check against scraped listings from public sources, e.g., other e-commerce websites including other C2C platforms, business-to-consumer (B2C) consignment sites, and/or retail platforms; and (4) confirm with the seller, including prompting for input to confirm whether any information retrieved from (1), (2), (3), or any combination thereof, is accurate according to the seller.

Per the above descriptions, whether receiving and parsing user input regarding an item, or whether checking any of (1), (2), (3), or any combination thereof, any matching may be performed at any stage of such process(es) described here. More specifically, the term "matching" may refer to more than determining text strings or other data sequences coincide.

For example, matching in any of the above scenarios may include use of natural language processing (NLP) techniques, including determining synonyms (including any abbreviations, acronyms, contractions, or expansions, e.g., by a synonym library or lookup table) and further searching to match any synonyms found, determining and/or further searching any other semantically related words for additional matching, performing word stemming based on least one language and corresponding morphological rule set(s), determining misspellings and equating the misspellings with correct spellings (or otherwise correcting misspellings) for additional matching, and so on for similar processing. Thus, matching may be recursive, in some embodiments. Using similar linguistic analysis of inputs or item descriptions, modifier terms, e.g., adjectives describing size or color, may be separated from other nominal identifier terms, e.g., names or nouns specifying an item.

Additionally, matching may be performed not only for generic terms or categorical descriptions, but also for proper nouns, e.g., brand names, genericized trademarks, etc. Classifier algorithms, in some embodiments, or other neural networks or artificial intelligence may be used to extract relevant terms from unstructured word sets such as search queries, user input, or item descriptions retrieved from (1), (2), or (3) as mentioned above. Thus, a given classifier may "understand" from a given unstructured word set what terms may be intended as brand names versus generic descriptions, and may be configured to update any database, library, or lookup table, etc., to include brand information in specific categories or sub-categories together with generic terms, for example, to improve matching. Matching algorithms or any components may be biased or tuned for precision or recall.

In some embodiments, such matching as described above may be performed locally on a client device, e.g., personal computer (PC) or mobile device such as a smartphone or tablet computer, remotely on self-hosted service (including dedicated server(s), virtual private server (VPS), or on-premises cloud) infrastructure, remotely via third-party services, or any combination thereof. In embodiments where the matching operations may be performed via multiple devices, certain matching operations may be performed locally, with intermediate results being delivered to remote services for confirmation, validation, other additional processing, or any combination thereof.

In an embodiment, one way to identify items or types of items may be to resolve a proposed new listing to correspond to a unique identifier, such as by comparison to items already mapped to unique identifiers, for example. Information on items confirmed in this manner may then correlate more reliably with information of other comparable items listed in the backend database or with other sources, for example. Search biasing and price recommendations may be provided accordingly, as additionally described with respect to FIGS. 2 and 5 below, and additionally in the "Probabilistic Search Biasing and Recommendations" application that was referenced above and incorporated by reference herein.

For some particularly unique items (e.g., one-of-a-kind items, custom-made items, craft items, personalized items, etc.), which may have no unique identifier corresponding to other items of the same type, there may be no unique identifier to which other like items are mapped. In such a case, the backend may proceed differently (not shown), such as by automatically referencing other platforms (e.g., of custom or craft items) for duplicate listings or immediately prompting the seller to confirm such uniqueness, in some example embodiments.

The reference or value may be a uniform, universal, and/or unique identifier, including but not limited to a stock-keeping unit (SKU), universal product code (UPC), uniform resource identifier (URI), uniform resource locator (URL), uniform resource name (URN), international standard book number (ISBN), Amazon standard item number (ASIN), etc., to which a given item may be mapped, in some embodiments. Additionally or alternatively, a value may include a checksum, fingerprint, signature, digest, hash, cryptographic hash, etc., corresponding to at least one of the first input or second input (e.g., character string item description, specific text field for brand name, enumerated selector for size, model year, etc.), to track inputs and outputs and/or determine duplicate inputs, for example. For purposes of FIG. 1 and this accompanying description, mapping a given item to a unique identifier may also be referred to as SKU-level matching or SKU-level data.

At the initial input stage, or at any subsequent input stage, such as action (4), system 100 may seek additional user input via the app, for example. Input may be text in the form of a character string, a photographic image, voice recognition, other characteristic sounds or audio fingerprints, for example. Text-based input via the app may prompt a user for a few fields of information depending on a broad category of the item to be listed for sale, rather than an exhaustive description of all features. In many cases, even basic text information may allow the backend to resolve SKU-level data, or at least present a few likely candidate items to a seller for confirmation of the correct item identification.

Aside from text-based strings or images, a mathematical or cryptographic signature in any representation may also be used. Barcodes or other patterns or sequences may be used. Other possible types of input include, without limitation, vibrational patterns, chemical samples and analysis thereof, measurements of radiation, electrical and/or magnetic signals, or any other environmental sensor input, etc.

Other forms of input may be received, such as in the form of output from other computer programs or algorithms, e.g., neural network output, perceptron output, image recognition output, classification output, or other types of output. These outputs may be based on other user inputs, e.g., from photographic data, voice or audio data, or other third-party resources, feeds, etc. Any or all such input may be generated by a mobile device, such as a tablet computer or smartphone, in some embodiments.

In a case of image input, a user attempting to create a new listing for sale may be prompted to take at least one photograph of the item to be listed. Photographic image data from the photograph(s) may be processed locally on the device running the app, or may be transmitted to the backend or to a third party for initial processing and/or further processing. Processing of the photographic image data may include use of artificial intelligence. Processing of the image data may include feeding the image data into a neural network, perceptron, or classifier, for example. The image data may be processed using computer-implemented image recognition, such as using at least one computer vision algorithm, in some embodiments. Any of the above technologies or their equivalents may be used to perform operations such as classification, object recognition and/or reverse image-searching, to name a few non-limiting examples.

Any neural networks described herein may include at least one artificial neural network (ANN). The ANN(s) may include at least one of a feedforward neural network, a recurrent neural network, a modular neural network, or a memory network, to name a few non-limiting examples. In the case of a feedforward neural network, for example, this may further correspond to at least one of a convolutional neural network, a probabilistic neural network, a time-delay neural network, a multi-layer perceptron, an autoencoder, or any combination thereof, in some embodiments. Such ANNs may have multiple layers—in some embodiments, the layers may be densely connected, such as in cases where activation functions may be reused from certain layers or where activation of one or more layers is skipped to resolve certain calculations, in some embodiments.

In further embodiments based on convolutional neural network (CNN) processing, for example, such CNNs may further integrate at least some filters (e.g., edge filters, horizon filters, color filters, etc.). These filters may include some of the edge detection algorithms, color filtering algorithms, and/or predetermined thresholds, for example. For desired results, a given ANN, including a CNN, may be designed, customized, and/or modified in various ways, for example, according to several criteria, in some embodiments.

Image recognition here may also leverage machine learning, in some embodiments. Image recognition systems may be trained using any of backend database listings, feed data of data partners, scraped listings from public sources, or any other source of accurate training data, for example. Image recognition may be further configured to detect and interpret barcodes, Quick Response (QR) codes, labels, tags, logos, trademarks, and/or any other defining characteristic of an item. Image recognition may additionally perform optical character recognition (OCR) and interpret text using natural language processing (NLP), in some embodiments. Thus, image recognition may be used to identify listed items, or at least candidate items for confirmation and selection, and may update selected items based on new information and calculations that may be subsequently introduced via various input sources.

As discussed above, actions (1)-(4) taken by system 100 may be performed in any order, taking or skipping any based on any other automated or manual determinations. However, accounting for reliability, computational efficiency, time, and potentially cost (of accessing certain platforms, for example), one default configuration may be to check first with the backend database on the same platform at (1), and if (1) sufficiently satisfies a condition (e.g., providing data points for a list of candidate items and/or another data point by which to confirm or update a selected item), then actions (2)-(4) may be bypassed, skipping to any update or confirmation actions. Additionally, subsequent actions may be "smart" or otherwise consider responses or results from previous actions as results become available.

Similarly, if (1) does not satisfy a condition, or if further input is otherwise sought, system 100 may proceed to taking action (2) or (3), depending on which is more efficient or depending on other factors. Additionally or alternatively, any of actions (1)-(4) may be performed in parallel, for potentially quicker resolution, in some embodiments.

Depending on a given platform and/or a given seller, seller input may be treated as less reliable than input gathered from any of (1)-(3). In some embodiments, if any or all of (1)-(3) are still insufficient for any reason, or for any other reason, (4) may optionally be pursued, requesting additional seller input, confirmation, or adjustments, for example. The action taken at (4) may include providing further prompts for input from the seller, including for additional details describing the item to be listed and/or confirmation of whether a selected item or other candidate items may match the item to be listed, in some embodiments.

Once system 100 "understands" what an item is, such as by artificial intelligence, image recognition, or any other means available to system 100, additional calculations may be performed, such as to analyze and categorize the items based on other data or corresponding metadata, such as price, condition, marketability trends, etc. More detail on these further calculations is described with respect to FIGS. 2 and 5 below, and additionally in the "Probabilistic Search Biasing and Recommendations" application incorporated by reference.

Figure 2:
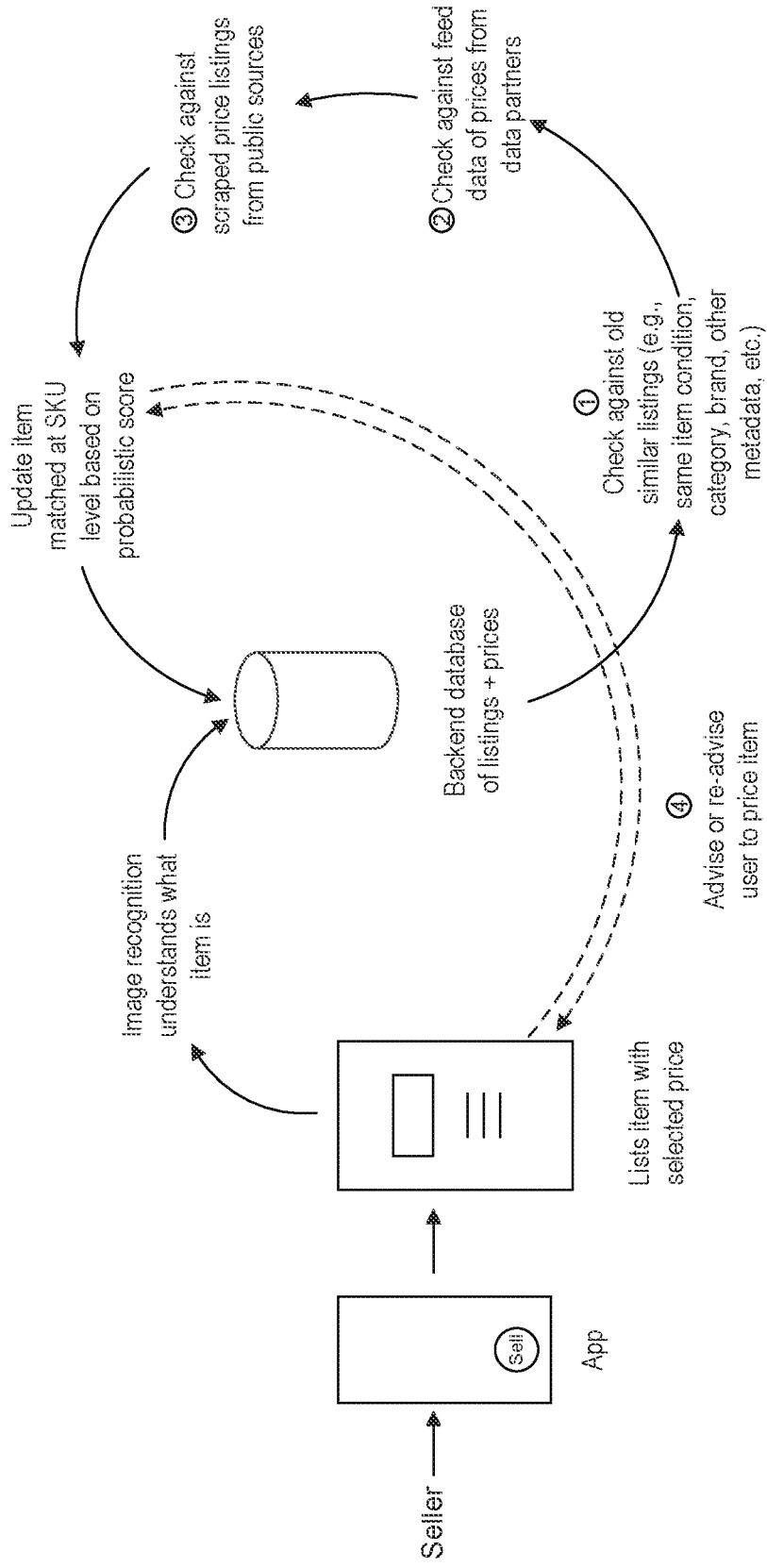
FIG. 2 is an illustration showing an example system useful for implementing methods including probabilistic search biasing and recommendations, according to some embodiments.

FIG. 2 is an illustration showing an example system useful for implementing methods including probabilistic search biasing and recommendations, according to some embodiments.

On the left-hand side of FIG. 2 is a representation of a seller and selling application (app), which may be used for displaying listed items for sale as well as for creating new listings of items for sale, in some embodiments. These representations involve a frontend design of the app, which may be a web app, mobile app (native, web-based, or hybrid, for example), and may involve varying levels of user interaction. Interaction with a buyer instead of a seller may involve similar interaction with the app, in some embodiments.

From the center to the right-hand side of FIG. 2 is a representation of an exemplary backend architecture that may be useful for implementing probabilistic search biasing and recommendations, according to an embodiment. Together, the components shown in FIG. 2, among others, may be treated as making up an example system 200, which may handle operations from storing, retrieving, and/or calculating data (item data, metadata, listings, databases, etc.) on the backend, and processing input, output, results, and related interaction on the frontend.

Beyond interaction with a user (e.g., buyer/seller), the backend may process input from a user and/or a variety of other sources. For example, if a seller provides input regarding an item for a new listing, the backend may seek to confirm, via other input, an identification of what the seller is attempting to list and typical or comparable list prices therefor, such as on the same market platform, other market platforms, consignment stores, retail stores, or a combination of the above. The other input may be prompted from the seller, automatically derived from other sources, or a combination of both, in some embodiments.

In an embodiment, one way to gather prices may be to start with an item already confirmed to match a given item in a database. An example of this is described with respect to FIGS. 1 and 4 herein, and additionally in the "Probabilistic Item Matching and Searching" application incorporated by reference. With an item confirmed in this manner, any corresponding price information may be expected to correlate more reliably with the item that the seller is attempting to list. Price recommendations may be generated accordingly.

Conversely, for unique items (e.g., one-of-a-kind items, custom-made items, craft items, personalized items, etc.), which may have no unique identifier corresponding to other items of the same type, the backend may proceed differently (not shown), such as by referring the seller to listings within the same broad category of unique items (e.g., based on user input of a broad category), automatically generate a price based on the broad category or comparable platform for such unique goods, and/or decline to provide a comparable or suggested price recommendation, in some example embodiments.

In order to generate a suggested price recommendation, the backend may do any of the following, in any order: (1) check against old listings in a backend database of listings; (2) check against feed data of data partners, e.g., via a subscription service between the same platform and a third-party provider; (3) check against scraped listings from public sources, e.g., other e-commerce websites including other C2C platforms, business-to-consumer (B2C) consignment sites, and/or retail platforms; and (4) confirm with the seller, including prompting for input to confirm or readjust the price, potentially with advice, automatically generated from the backend, as to why the seller may want to readjust the price and by how much, in some embodiments.

At any of steps (1), (2), or (3) in system 200, price information may be collected and statistically analyzed with respect to other parameters or variables, e.g., including any other data or metadata for price and correlating with listed condition (new, like-new, very good, good, fair, poor, etc.), category, brand, size, etc., whether on the same platform or on other platforms such as third-party sources or public sources, normalized for any differences in metadata (item condition scales, locality variations in pricing, seasonal variations in pricing, etc.) that may arise on the other platforms. Statistical analysis here may include averaging or calculation of trends for any set(s) of these data points or metadata categories, for example.

As discussed above, actions (1)-(4) taken by system 200 may be performed in any order, taking or skipping any based on any other automated or manual determinations. However, accounting for reliability, computational efficiency, time, and potentially cost (of accessing certain platforms, for example), one default configuration may be to check first with the backend database on the same platform at (1), and if (1) sufficiently satisfies a condition (e.g., providing data points for a list of candidate items and/or another data point by which to confirm or update a selected item), then actions (2)-(4) may be bypassed, skipping to any update or confirmation actions.

Similarly, if (1) does not satisfy a condition, or if further input is otherwise sought, system 200 may proceed to taking action (2) or (3), depending on which is more efficient or depending on other factors. Additionally or alternatively, any of actions (1)-(4) may be performed in parallel, for potentially quicker resolution, in some embodiments.

Depending on a given platform and/or a given seller, seller input may be treated as less reliable than input gathered from any of (1)-(3). In some embodiments, if any or all of (1)-(3) are still insufficient for any reason, or for any other reason, (4) may optionally be pursued, requesting additional seller input, confirmation, or adjustments, for example. The action taken at (4) may include providing further advice, automatically generated from the backend, as to why the seller may want to readjust the price and by how much, in some embodiments.

Regarding automatic biasing of search results, the same metadata considered with respect to price may be considered in determining where in a given search result set a new or existing listing for sale should appear. Based on various consideration including price, probability scores (e.g., of likelihoods that the item will sell within a given time period), item condition, geography, season, time of day, cyclical or secular trends, larger-scale trends, and/or any other information that may be gathered from (1)-(3) and/or (4), in some cases, search result rankings may be upgraded (promoted, boosted, or otherwise augmented) or downgraded (demoted, suppressed, or otherwise diminished). Other factors in biasing search results may depend on individual buyers searching, or application programming interfaces (APIs) or media by which searches may be conducted or by which results may be retrieved.

Some use cases for biasing may be to improve turnaround time for shipping and/or delivery of items sold, by biasing local results over more remote results. Here, "local" may refer not merely to geographical distance, but rather to "shipping distance," or average transit times of parcels along particular routes or within/across particular geographic regions, for example. Other factors may include similarity of different items that may also be from local sellers, how long a given item has been listed for sale, whether a given buyer or other buyers have expressed interest in the item (e.g., via a given platform), etc. In some cases, sellers may also be given some control over search biasing, e.g., a guaranteed promotion for a certain time, or based on seller rating, karma, credit, etc., in some embodiments.

For buyers searching for particular items, which may match a unique identifier for multiple instances worldwide, for example, a search engine may surface local sellers (close to the buyer in shipping distance) before more remote sellers, even if the more remote sellers may have other attributes potentially of interest to the buyer, in some cases. In some embodiments, search biasing may be configured to override or weigh more heavily against existing user-specified search filters or preferences, for example.

Other factors that the search engine may account for may include shipping costs for sellers and/or platforms, sales taxes for buyers and/or platforms, profitability for sellers and/or platforms, among other possibilities. Such search biasing techniques, while potentially beneficial for C2C platforms, may also yield similar benefits for B2C platforms or B2B platforms, in some use cases.

Such preferential search biasing may additionally be useful to a market platform in order to preserve QoS or adhere to an SLA, in further examples. Thus, using at least the enhanced techniques described herein, searchability may be improved with respect to certain attributes of buyers and/or sellers with respect to items transacted, in some embodiments.

Figure 3:
FIG. 3 is an illustration showing an example screen display including an exemplary prompt for input of a value, according to some embodiments.

FIG. 3 illustrates an examples of screen display 300 of an exemplary user interface as may be rendered on a computing device comprising a display apparatus, according to some embodiments. Screen display 300 may include various regions for output of textual values and/or graphical elements, as well as prompts for input in various forms. For example, user input may be provided via any graphical user interface (GUI) element(s), a textual user interface (TUI), voice commands, accelerometers or other environmental sensors, etc.

The screen display provided in FIG. 3 is merely exemplary, and is provided to illustrate some example outputs and inputs as may relate to enhanced techniques of probabilistic item matching, searching, search biasing, and recommendations as described herein. Persons skilled in the relevant art(s) will appreciate that various approaches may be taken to provide a suitable screen display 300 in accordance with this disclosure.

Screen display 300 may include various indicators and control elements that may be displayed and arranged according to any appropriate methodology, framework, toolkit, widget set, guidelines, design language etc. Examples include flat design, hierarchical design, layered design, WIMP design (windows, icons, menus, pointer), natural user interface (NUI), reality-based interface (RBI), augmented reality (AR), e.g., with heads-up display (HUD), virtual reality (VR), e.g., with a virtual storefront, etc. User input may be provided using pointing devices such as a mouse, trackball, joystick, touchpad, touchscreen, etc., as well as other forms of touch, spatial navigation, eye tracking, voice commands, environmental sensors, scripted or programmatic input via API, etc. Equivalent means of input may be used additionally or alternatively as understood in the art.

Screen display 300 may include a title, such as that shown at the top of screen display 300 in FIG. 3, in some embodiments. In another region of screen display 300, other GUI elements, widgets, knobs, sliders, scrollbars, buttons, or related features may be presented for a user to interact with any underlying hardware and/or software, for example.

For further illustration, an example is shown in FIG. 3. In the example shown in FIG. 3, $990 is a "Suggested price" representing one example of a suggested value that is output on a screen display. Additionally output with the suggested value is a prompt for further input. The further input may be provided via buttons ("List" or "Save draft") and/or via a slider, knob, or equivalent element, e.g., in hardware (physical buttons, knobs, sliders, etc.), software (GUI, TUI, voice command, etc.), or any combination thereof.

Shown in FIG. 3 in the same field as the suggested value is a non-limiting example of a GUI-based slider element, which a user may adjust to change an actual desired sale price for listing an item to sell. Responsive to the further input, any of the values described above, including the suggested value and/or any of the at least two values that may be used to define any range, for example, may be updated and similarly output, updating any existing output, in some embodiments. Any number of buttons or text fields may also be used for input.

Additional values are displayed, such as a "Sell faster" suggestion and a "Sell slower" suggestion to either side of the central suggested value of "Suggested price" as may be determined based on probability scores for the values described in 508 below. This combination of suggested prices forms one example of a pricing guide. Other formats and suggestions may be presented in any configuration to create an equivalent pricing guide, or another guide using other parameters besides or in addition to list prices, in other embodiments.

Further values that may be output via screen display 300, as shown in FIG. 3, include minimum and maximum possible prices, which may be determined by a given platform, for example. A fee or commission rate may also be displayed, as well as a calculation of the fee or commission based on a desired sale price that may be selected via an element of screen display 300. In addition to the calculated fee or commission, remaining proceeds from a projected sale may also be displayed.

For additional output, any number of text fields or images may be displayed. Output may also be accomplished by various other means, including sound, haptic feedback, external electronic indicators including light-emitting diodes (LEDs) or additional external displays, etc. Any number of outputs and/or input prompts may be displayed simultaneously or sequentially in any arrangement or timing.

While screen display 300 of FIG. 3 shows one example configuration, practically any other configuration is possible within the scope and spirit of this disclosure to aid developers and users in designing, implementing, configuring, and using an interface and apparatus or system implementing the enhanced techniques described herein.

Figure 4:
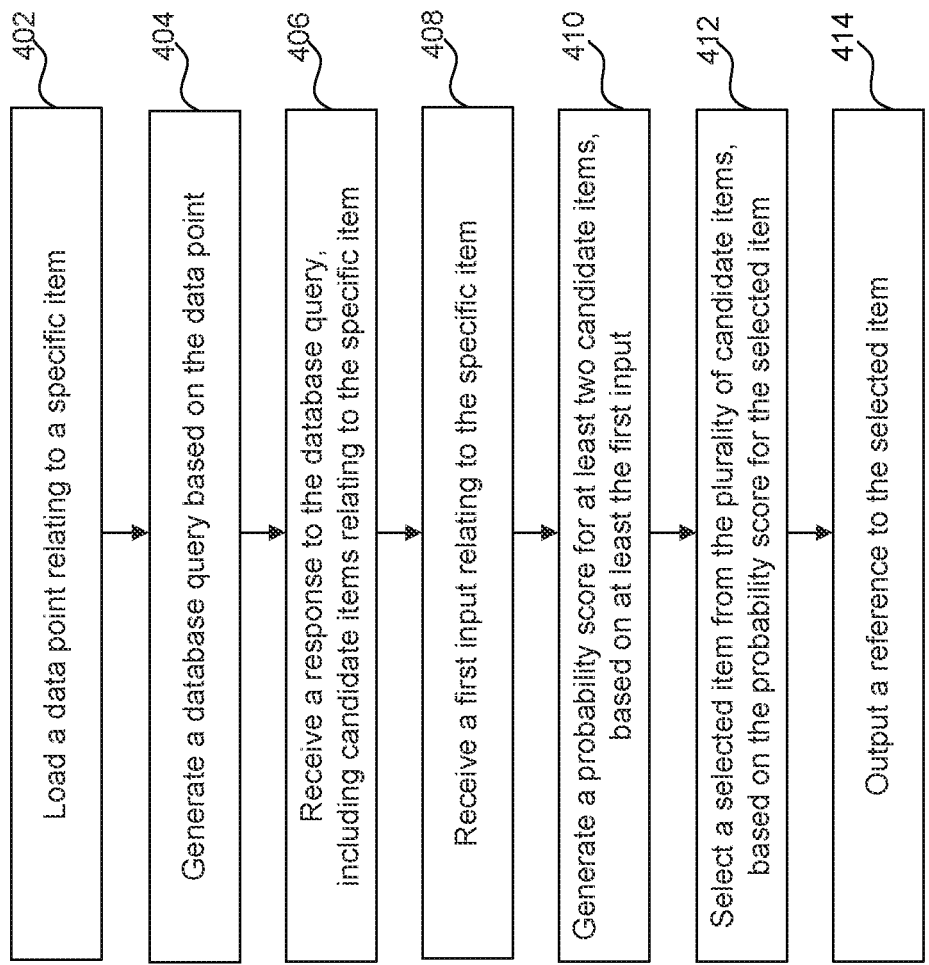
FIG. 4 is a flowchart illustrating a method including probabilistic item matching and searching, according to some embodiments.

FIG. 4 is a flowchart illustrating a method 400 for probabilistic item matching and searching, according to some embodiments. Method 400 may be performed by processing logic that may comprise hardware (e.g., circuitry, dedicated logic, programmable logic, microcode, etc.), software (e.g., instructions executing on a processing device), or a combination thereof. Not all steps of method 400 may be needed in all cases to perform the enhanced techniques disclosed herein. Further, some steps of method 400 may be performed simultaneously, or in a different order from that shown in FIG. 4, as will be understood by a person of ordinary skill in the art.

Method 400 shall be described with reference to FIGS. 1 and 6. However, method 400 is not limited only to those example embodiments. The steps of method 400 may be performed by at least one computer processor coupled to at least one memory device. An exemplary processor and memory device(s) are described below with respect to 604 of FIG. 6. In some embodiments, method 400 may be performed using system 100 of FIG. 1, which may further include at least one processor and memory such as those of FIG. 6.

In 402, at least one processor such as processor 604 may load a data point relating to a specific item. For example, the data point may be an input value from a user, which may include a character string, number, or other information that may potentially identify the specific item, for example. Any loaded data point or received input may be stored in a memory, for example, such as main memory 608. The user input or data point(s) relating to the specific item may be incomplete or ambiguous, in some cases. Leveraging enhanced techniques for probabilistic matching and searching that are described herein, a suitable result may be delivered despite sparse, incomplete, or ambiguous input, thereby improving accuracy of search results otherwise obtainable, and reducing a level of effort and interaction required of a user, according to some embodiments.

In a further example of 402, the data point may be a description, title, name, or otherwise brief characterization or statement describing an item, as may be arbitrarily entered by a user, in some embodiments. Depending on the user and any category to which the item belongs, the input may be in response to a specific prompt (not shown), for example. The data point may, additionally or alternatively, be based on non-textual data, e.g., from a sensor, camera, voice recognition, artificial intelligence or neural network to generate descriptions based on other input or environmental factors, etc. The data point may originate and be sent or received programmatically and/or in an automated fashion, such as by an application programming interface (API) for example, not necessarily by manual input from a user, in some embodiments.

In 404, processor 604 may generate a database query based on the data point. The database query is not limited to a query of a traditional structured database. Rather, for purposes of this disclosure, a database query is any query that may function like a database query. For example, any term, expression, or value (or any part thereof) used to determine a match against other data may be considered to be a database query for purposes of this disclosure. Similarly, any entry in a "database" may correspond to any listing, data structure, web page, or other entity from which item data or corresponding metadata may be extracted, scraped, parsed, or otherwise handled, in some embodiments.

In some embodiments, the query may be a string literal, for example, corresponding to a title or description, for example. In some embodiments, the query may be a regular expression or similar input having special characters or components intended to match more than the literal input string itself. In some embodiments, the database query may include operators and/or syntax such as with SQL queries for example. However, such queries are not necessarily limited to accessing SQL databases—other types of databases, data stores, data lakes, data pools, data feeds, data streams, etc., may be used, and may be unstructured or partially structured if not fully structured. In some embodiments, the query may be used for a public resource, third-party resource, library, database, or web search, such as using a web search engine, for example.

In 406, processor 604 may receive a response to the database query, wherein the response comprises a plurality of candidate items relating to the specific item. In some embodiments, the response received may be stored in memory, such as memory 608. While it may be possible, in some cases, for the response to have less than a plurality of candidate items, i.e., one or zero, in such cases, the probabilistic search and matching may be short-circuited in such cases and conclude early. In other cases, where the response to the database query includes multiple candidate item results, processing of method 400 may continue, to determine, with a level of confidence, at least one top result, for example.

In 408, processor 604 may receive a first input relating to the specific item. The first input may be used for further qualifying the data point, regardless of any type or format of the data point, for example. In some embodiments, first input may be a different text object (e.g., string) even if the data point is a text object—the data point and the first input may describe different elements of a text description (e.g., name, make, model, year, size, etc.), or may be different parts of the same element, for example.

In other cases, the first input may be of a different type, e.g., where the data point may be text in the form of a character string, the first input may be a photographic image, or vice-versa. Other types may be used, including voice recognition or other characteristic sounds or audio fingerprints, for example. Aside from text-based strings, a mathematical or cryptographic signature in any representation may also be used. Barcodes or other patterns or sequences may be used.

Other possible types of input include, without limitation, vibrational patterns, chemical samples and analysis thereof, measurements of radiation, electrical and/or magnetic signals, or any other environmental sensor input, etc. Other forms of input may be received, such as in the form of output from other computer programs or algorithms, e.g., neural network output, perceptron output, image recognition output, classification output, or other types of output. These outputs may be based on other user inputs, e.g., from photographic data, voice or audio data, or other third-party resources, feeds, etc.

The first input may be received in response to any variety of prompts, e.g., on a screen, e.g., of a mobile device, via another visible or audible indicator, over a network, and/or via an API from a local or remote program (with respect to a device performing the probabilistic matching and searching, for example. Similarly, a second input, third input, or any further input may be received in response to any similar or related prompts, for example.

In 410, processor 604 may generate a probability score for at least two candidate items of the plurality of candidate items in the response, based on at least the first input. The probability score may be in absolute terms or in relative terms to other candidates, for example. In relative terms to other candidates, the other candidates may be candidates received in response to the database query, and/or may represent candidates from multiple queries and responses thereto (e.g., a history of past queries and responses, at least within a predetermined time frame, etc.). In this latter case of generating probability score generation from multiple queries or responses, probability scoring may be cumulative over a specific time period and/or over all time. In such cases of cumulative probability scoring, additional algorithms, including machine learning, may be useful to improve accuracy of probability scores over time and iterations of machine learning, including by deep learning networks, in some embodiments.

Probability scores as described herein may be generated locally on a client device, e.g., PC or mobile device such as a smartphone or tablet computer, remotely on self-hosted service (including dedicated server(s), VPS, or on-premises cloud) infrastructure, remotely via third-party services, or any combination thereof. In embodiments where the probability score generation may be performed via multiple devices, a first device may be configured to send or pass a structured data query (e.g., in markup, serialized format, key-value pair, etc.) or other data structure to a second device such that processing may be initiated or continued to allow a resulting probability score to be generated and returned, either to the first device, a module of the second device, or a third device, for example. In some embodiments, not all components of the query or data structure may contain structured data for expected operation.

According to some embodiments, item listings or search results may be biased or ranked based on probability scores that may be generated as described herein. Thus, in some use cases relying on remote databases or third-party service providers to generate matches and/or probability scores and return results, implementations of scoring and ranking may be realized to provide relatively high levels of specificity in results, without requiring user input of a certain specificity, e.g., a SKU, at the local device, e.g., smartphone or PC terminal.

In 412, processor 604 may select a selected item from the plurality of candidate items, based on the probability score for the selected item. Based on at least one of the data point and the first input, processor 604 may select a candidate item as a selected item. In some embodiments, processor 604 may select the candidate item having the highest corresponding probability score, for example, to be the selected item. In addition, or instead, processor 604 may select the selected item based on any other criteria or conditions, in other embodiments.

In response to loading any data point or to receiving any first input, second input, third input, or any further input, in some embodiments, probability scores may be updated or otherwise change. To the extent that the candidate item having the highest corresponding probability score may also change in response, such a change may also be reflected in the selected item. For example, processor 604 may change the selected item to the candidate item having a highest corresponding probability score, if the selected item is not already the same as the candidate item having the highest corresponding probability score. Other criteria may be used, additionally or alternatively, for selecting, updating, or otherwise changing the selected item, in other embodiments.

In 414, processor 604 may output a reference to the selected item. Specifically, as an output, processor 604 may return a reference or some other value as a result, in some embodiments. The reference or value may allow a separate function, module, device, user, or other entity to recognize or determine the resulting selected item. The reference or value may be a uniform, universal, and/or unique identifier, including but not limited to SKU, UPC, URI, URL, URN, ISBN, ASIN, etc., to which a given item may be mapped, in some embodiments. Additionally or alternatively, a value may include a checksum, fingerprint, signature, digest, hash, or cryptographic hash, corresponding to at least one of the data point or second input, to track inputs and outputs and/or determine duplicate inputs, for example.

Additionally, the output of 414, either by reference or by value, may be used as input for further methods, systems, and/or devices. For example, a reference or identifying value corresponding to the selected item may be reliably used as input for further recommendations and/or biasing of search results, such as in 502 of method 500 and FIG. 5, described in more detail below. Further details of such uses and data flows are described additionally in the "Probabilistic Search Biasing and Recommendations" application incorporated by reference herein. Output of 414 may also be used with respect to the "Inventory Ingestion, Image Processing, and Market Descriptor Pricing System," "Inventory ingestion and Pricing System," and "System and Method for Determining Sellability Score and Cancellability Score," applications, each filed herewith and incorporated by reference as noted above.

Method 400 is disclosed in the order shown above in this exemplary embodiment of FIG. 4. In practice, however, the operations disclosed above, alongside other operations, may be executed sequentially in any order, or they may alternatively be executed concurrently, with more than one operation being performed simultaneously, or any combination of the above.

Figure 5:
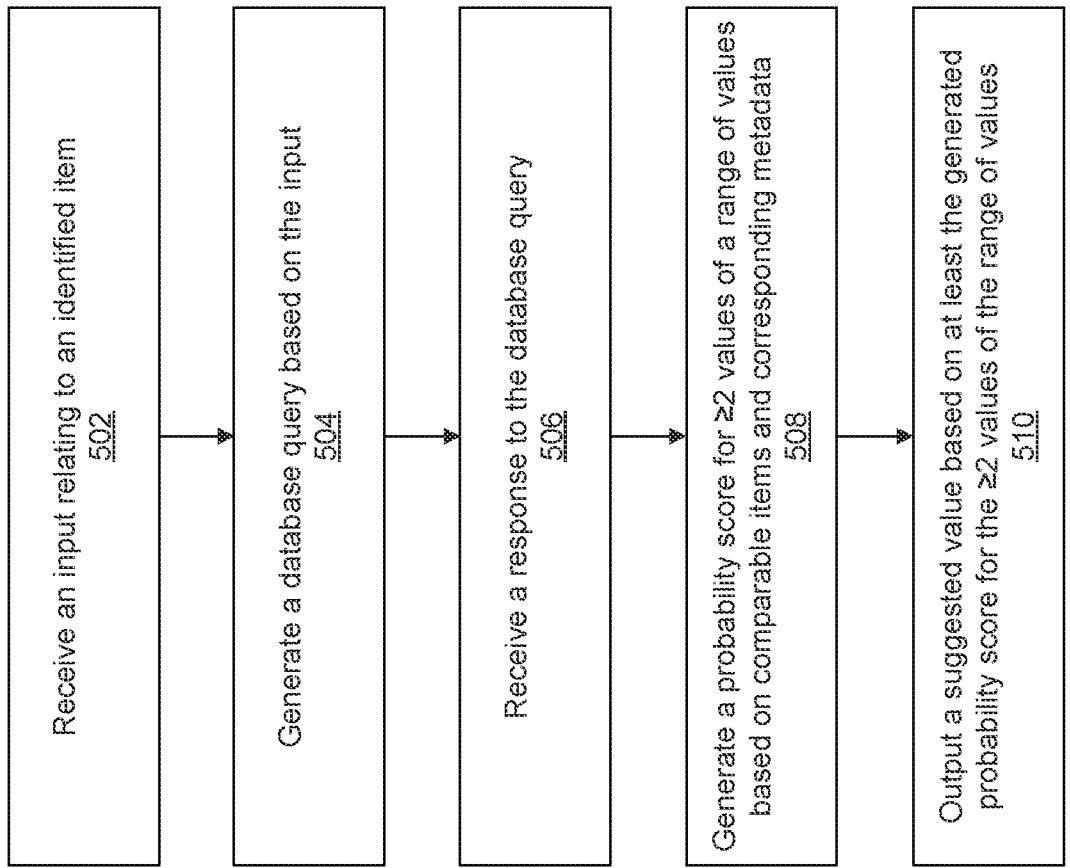
FIG. 5 is a flowchart illustrating a method including probabilistic search biasing and recommendations, according to some embodiments.

FIG. 5 is a flowchart illustrating a method 500 including probabilistic item matching and searching, according to some embodiments. Method 500 may be performed by processing logic that may comprise hardware (e.g., circuitry, dedicated logic, programmable logic, microcode, etc.), software (e.g., instructions executing on a processing device), or a combination thereof. Not all steps of method 500 may be needed in all cases to perform the enhanced techniques disclosed herein. Further, some steps of method 500 may be performed simultaneously, or in a different order from that shown in FIG. 5, as will be understood by a person of ordinary skill in the art.

Method 500 shall be described with reference to FIGS. 1 and 6. However, method 400 is not limited only to those example embodiments. The steps of method 400 may be performed by at least one computer processor coupled to at least one memory device. An exemplary processor and memory device(s) are described below with respect to 604 of FIG. 6. In some embodiments, method 400 may be performed using system 100 of FIG. 1, which may further include at least one processor and memory such as those of FIG. 6.

In 502, a processor such as processor 604 may receive an input relating to an identified item. The identified item, in some embodiments, may be an output selected item, such as from 414 in reference to FIG. 4 above, and as described in the "Probabilistic item Matching and Searching" application that was referenced above and incorporated by reference herein. To the extent that method 500 may employ any additional or alternative way of identifying items, in addition to or instead of the probabilistic item matching and/or searching described with respect to method 400 above, input received in 502 may be similar to the input received in 402 above, for example.

Separately, in other embodiments of 502, the input may be a description, title, name, or otherwise brief characterization or statement describing an item, as may be arbitrarily entered by a user, for example. Depending on the user and any category to which the item belongs, the input may be in response to a specific prompt (not shown), for example. The input may, additionally or alternatively, be based on non-textual data, e.g., from a sensor, camera, voice recognition, artificial intelligence or neural network to generate descriptions based on other input or environmental factors, etc. The input may originate and be sent or received programmatically and/or in an automated fashion, such as by an application programming interface (API), for example, not necessarily by manual input from a user.

In 504, processor 604 may generate a database query based on the input. The database query is not limited to a query of a traditional structured database. Rather, for purposes of this disclosure, a database query is any query that may function like a database query. For example, any term, expression, or value (or any part thereof) used to determine a match against other data may be considered to be a database query for purposes of this disclosure. Similarly, any entry in a "database" may correspond to any listing, data structure, web page, or other entity from which item data or corresponding metadata may be extracted, scraped, parsed, or otherwise handled, in some embodiments.

In some embodiments, the query may be a string literal, for example, corresponding to a title or description, for example. In some embodiments, the query may be a regular expression or similar input having special characters or components intended to match more than the literal input string itself. In some embodiments, the database query may include operators and/or syntax such as with SQL queries for example. However, such queries are not necessarily limited to accessing SQL databases—other types of databases, data stores, data lakes, data pools, data feeds, data streams, etc., may be used, and may be unstructured or semi-structured if not fully structured. In some embodiments, the query may be used for a public resource, third-party resource, library, database, or web search, such as using a web search engine, for example.

In 506, processor 604 may receive a response to the database query, wherein the response comprises a plurality of comparable items, wherein the comparable items are similar to the identified item, and wherein the response further comprises corresponding metadata for the plurality of comparable items, including a range of values corresponding to the plurality of comparable items. While it may be possible, in some cases, for the response to have less than a plurality of comparable items, i.e., one or zero, in such cases, the probabilistic recommendations may be short-circuited in such cases and conclude early. In other cases, where the response to the database query includes multiple comparable item results, processing of method 500 may continue.

As a separate but related consideration, if a specific metadata field of interest is blank, spurious, or otherwise uninformative for a given comparable item, processor 604 may, in some cases, ignore the corresponding comparable item for purposes of further computations regarding the same metadata field of interest. In one exemplary use case, a given item may be determined to be a comparable item by virtue of at least some elements of its description being similar to corresponding elements of the input in 502. However, if processor 604 may be comparing comparable items to determine reasonable price ranges for how an input item (e.g., of 502) may sell in a given market, for example, processor 604 may ignore certain comparable items if their corresponding price (meta) data were missing or were statistical outliers (likely uninformative or spurious data), according to some embodiments.

In 508, processor 604 may generate a probability score for at least two values of the range of values, based at least on the corresponding metadata for the plurality of comparable items. Following the example immediately above, processor 604 may be comparing comparable items to determine reasonable price ranges for how an input item (e.g., of 502) may sell in a given market. Meaningful output may not be one single value, but may, depending on other factors, be reflected by two or more values. Additionally or alternatively, two values of the at least two values may represent a low value and a high value, e.g., defining a given range of values.

For example, two values may define a range of prices within which a given item (e.g., input of 502) has at least a certain probability of selling within a given period of time (duration and/or specific dates). Separately, a different range of prices may be determined for probability of completing a sale irrespective of time. In a further embodiment, a first value may represent a highest price for a given probability of sale irrespective of time, and a second value may be determined to be a highest price for a given probability of sale within a given time constraint.

In 510, processor 604 may output at least a suggested value based on at least the generated probability score for the at least two values of the range of values, together with a prompt for further input. The suggested value may be one of the at least two values described with respect to 508 above, in some embodiments. In other embodiments, the suggested value may be distinct from any of the at least two values of 508, for example, but may be derived from any of the at least two values described with respect to 508 above, in some cases.

For further illustration, an example is shown in FIG. 3. In the example shown in FIG. 3, $990 is a "Suggested price" representing one example of a suggested value that is output on a screen display. Additionally output with the suggested value is a prompt for further input. The further input may be provided via buttons ("List" or "Save draft") and/or via a slider, knob, or equivalent element, e.g., in hardware (physical buttons, knobs, sliders, etc.), software (GUI, TUI, voice command, etc.), or any combination thereof.

Shown in FIG. 3 in the same field as the suggested value is a non-limiting example of a GUI-based slider element, which a user may adjust to change an actual desired sale price for listing an item to sell. Responsive to the further input, any of the values described above, including the suggested value and/or any of the at least two values that may be used to define any range, for example, may be updated and similarly output, updating any existing output, in some embodiments.

Additional values are displayed, such as a "Sell faster" suggestion and a "Sell slower" suggestion to either side of the central suggested value of "Suggested price" as may be determined based on probability scores for the values described in 508 above. This combination of suggested prices forms one example of a pricing guide. Other formats and suggestions may be presented in any configuration to create an equivalent pricing guide, or another guide using other parameters besides or in addition to list prices, in other embodiments.

In further embodiments, a time value may be output, based at least on at least one comparable item and corresponding metadata. Additionally or alternatively, the time value may be set by a user at the user's discretion. The time value, as may be stored in memory 608, may be used to calculate any of the at least two values described in 508, for example, at least for any time-sensitive probability scores. By way of further illustration, the time value may be a period of time in which a sale has a given probability score, e.g., six hours, two days, one week, etc. While such a time value may be stored and associated with a corresponding probability score or other value, the time value may also be optionally displayed to a user alongside or in place of any other value(s), for example.

As with the probability score, suggested value, and other values described above, the time value may be updated in response to any user input (e.g., first input, second input, etc.) or further user input, and the updated time value and/or probability score(s) may be output, updating any existing output, in some embodiments. Additional operations of updating or refreshing, based on any user input and/or any periodic refresh cycle, for example, may be performed in accordance with any other related technique understood in the art.

Method 500 is disclosed in the order shown above in this exemplary embodiment of FIG. 5. In practice, however, the operations disclosed above, alongside other operations, may be executed sequentially in any order, or they may alternatively be executed concurrently, with more than one operation being performed simultaneously, or any combination of the above.

Example Computer System

Figure 6:
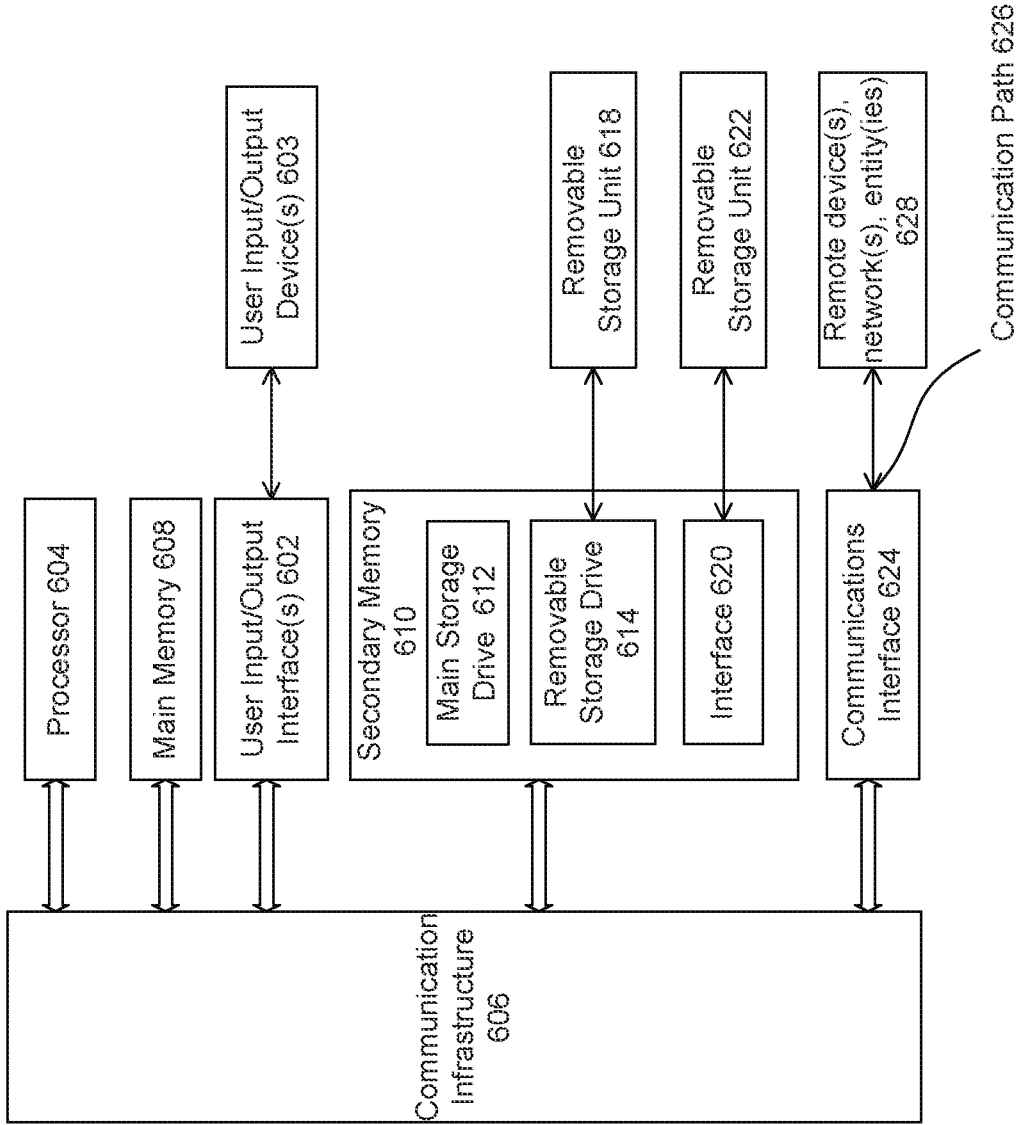
FIG. 6 illustrates a block diagram of a general purpose computer that may be used to perform various aspects of the present disclosure.

Various embodiments may be implemented, for example, using one or more computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a bus or communication infrastructure 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. With capabilities of general-purpose computing on graphics processing units (GPGPU), the GPU may be particularly useful in at least the image recognition and machine learning aspects described herein.

Additionally, one or more of processors 604 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or secondary memory 610. Secondary memory 610 may include, for example, a main storage drive 612 and/or a removable storage device or drive 614. Main storage drive 612 may be a hard disk drive or solid-state drive, for example. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624, Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communication path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 600 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (Paas), desktop as a service (DaaS), framework as a service (FaaS), backend as a service (Baas), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAM), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data, Exchange (WDDX), Web Hypertext Application Technology Working Group (WHATWG) HTML5 Web Messaging, Representational State Transfer (REST or RESTful web services), Extensible User interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Scala, Clojure, Elixir, Swift, Go, Perl, PHP, Python, Ruby, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships Or equivalents thereof) are appropriately performed. Also, alternative embodiments can perform functional blocks, steps, operations, methods, etc. using orderings different from those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
generating, by at least one computer processor, a database query based on an input relating to an identified item;
receiving, by the at least one computer processor, a response to the database query, wherein the response comprises a plurality of comparable items, wherein the plurality of comparable items have been determined to be similar to the identified item based on at least one element of textual or non-textual descriptive data corresponding both to the identified item and to the plurality of comparable items, wherein the response further comprises corresponding metadata for the plurality of comparable items, including a plurality of values corresponding to the plurality of comparable items and a type of market platform corresponding to each of the plurality of comparable items, and wherein the plurality of values are normalized for differences in the corresponding metadata due to differences in the type of market platform corresponding to each of the plurality of comparable items;
generating, by the at least one computer processor, a probability score for at least two values of a range of values of the normalized plurality of values, based at least on a statistical analysis of the corresponding metadata for the plurality of comparable items;

modifying, by the at least one computer processor, a search ranking of the identified item, based on availability of application program interfaces (APIs) by which the identified item can be searched; and outputting, by the at least one computer processor, at least a suggested value based on at least the generating the probability score for the at least two values of the range of values, together with a prompt for further input.

2. The method of claim 1, further comprising:
outputting, by the at least one computer processor, at least a low value and a high value based on at least the generating the probability score for the at least two values of the range of values, together with the prompt for further input.

3. The method of claim 1, further comprising:
receiving, by the at least one computer processor, the further input in response to the prompt for the further input;
updating, by the at least one computer processor, the probability score for the at least two values of the range of values based on at least the further input; and
outputting, by the at least one computer processor, at least the updated probability score for one of the at least two values of the range of values.

4. The method of claim 1, further comprising:
outputting, by the at least one computer processor, a time value based on at least the corresponding metadata for the plurality of comparable items and the generating the probability score for the at least two values of the range of values.

5. The method of claim 4, further comprising:
receiving, by the at least one computer processor, the further input in response to the prompt for the further input;
updating, by the at least one computer processor, at least one of the time value and the probability score for the at least two values of the range of values based on at least the further input; and
outputting, by the at least one computer processor, at least one of the time value and the updated probability score for one of the at least two values of the range of values.

6. The method of claim 1, further comprising:
outputting, by the at least one computer processor, at least a first high value based on at least a first given probability and a second high value based on at least a second given probability, together with the prompt for further input.

7. The method of claim 1, wherein the response to the database query comprises at least one data entry derived from at least one public source or at least one third-party source.

8. The method of claim 1, wherein further differences in the corresponding metadata for the plurality of comparable items include at least one of variations in item condition scales, locality based variations in pricing, and seasonal variations in pricing.

9. A system, comprising:
a memory; and
at least one processor coupled to the memory, the at least one processor configured to:
generate a database query based on an input relating to an identified item;
receive a response to the database query, wherein the response comprises a plurality of comparable items, wherein the plurality of comparable items have been determined to be similar to the identified item based on at least one element of textual or non-textual descriptive data corresponding both to the identified item and to the plurality of comparable items, wherein the response further comprises corresponding metadata for the plurality of comparable items, including a plurality of values corresponding to the plurality of comparable items and a type of market platform corresponding to each of the plurality of comparable items, and wherein the plurality of values are normalized for differences in the corresponding metadata due to differences in the type of market platform corresponding to each of the plurality of comparable items;
generate a probability score for at least two values of a range of values of the normalized plurality of values, based at least on a statistical analysis of the corresponding metadata for the plurality of comparable items;
modify a search ranking of the identified item, based on availability of application program interfaces (APIs) by which the identified item can be searched; and
output at least a suggested value based on at least the generating the probability score for the at least two values of the range of values, together with a prompt for further input.

10. The system of claim 9, the at least one processor further configured to:
output at least a low value and a high value based on at least the generated probability score for the at least two values of the range of values, together with the prompt for further input.

11. The system of claim 9, the at least one processor further configured to:
receive the further input in response to the prompt for the further input;
update the probability score for the at least two values of the range of values based on at least the further input; and
output at least the updated probability score for one of the at least two values of the range of values.

12. The system of claim 9, the at least one processor further configured to:
output a time value based on at least the corresponding metadata for the plurality of comparable items and the generated probability score for the at least two values of the range of values.

13. The system of claim 12, the at least one processor further configured to:
receive the further input in response to the prompt for the further input;
update at least one of the time value and the probability score for the at least two values of the range of values based on at least the further input; and
output at least one of the time value and the updated probability score for one of the at least two values of the range of values.

14. The system of claim 9, the at least one processor further configured to:
output at least a first high value based on at least a first given probability and a second high value based on at least a second given probability, together with the prompt for further input.

15. The system of claim 9, wherein the response to the database query comprises at least one data entry derived from at least one public source or at least one third-party source.

16. A non-transitory computer-readable storage medium having instructions stored thereon that, when executed by at least one computing device, cause the at least one computing device to perform operations comprising:
- generating a database query based on an input relating to an identified item;
- receiving a response to the database query, wherein the response comprises a plurality of comparable items, wherein the plurality of comparable items have been determined to be similar to the identified item based on at least one element of textual or non-textual descriptive data corresponding both to the identified item and to the plurality of comparable items, wherein the response further comprises corresponding metadata for the plurality of comparable items, including a plurality of values corresponding to the plurality of comparable items and a type of market platform corresponding to each of the plurality of comparable items, and wherein the plurality of values are normalized for differences in the corresponding metadata due to differences in the type of market platform corresponding to each of the plurality of comparable items;
- generating a probability score for at least two values of a range of values of the normalized plurality of values, based at least on a statistical analysis of the corresponding metadata for the plurality of comparable items;
- modifying a search ranking of the identified item, based on availability of application program interfaces (APIs) by which the identified item can be searched; and
- outputting at least a suggested value based on at least the generating the probability score for the at least two values of the range of values, together with a prompt for further input.

17. The non-transitory computer-readable storage medium of claim 16, the operations further comprising:
- outputting at least a low value and a high value based on at least the generating the probability score for the at least two values of the range of values, together with the prompt for further input.

18. The non-transitory computer-readable storage medium of claim 16, the operations further comprising:
- receiving the further input in response to the prompt for the further input;
- updating at least one of the time value and the probability score for the at least two values of the range of values based on at least the further input; and
- outputting at least the updated probability score for one of the at least two values of the range of values.

19. The non-transitory computer-readable storage medium of claim 16, the operations further comprising:
- outputting a time value based on at least the corresponding metadata for the plurality of comparable items and the generating the probability score for the at least two values of the range of values.

20. The non-transitory computer-readable storage medium of claim 19, the operations further comprising:
- receiving the further input in response to the prompt for the further input;
- updating the probability score for the at least two values of the range of values based on at least the further input; and
- outputting at least one of the time value and the updated probability score for one of the at least two values of the range of values.

* * * * *